Jan. 4, 1966   P. V. MALLOY   3,226,997
HAND-OPERATED EXTENSIONS FOR PEDAL TYPE
CONTROLS FOR AUTOMOTIVE VEHICLE
Filed May 3, 1965   2 Sheets-Sheet 1
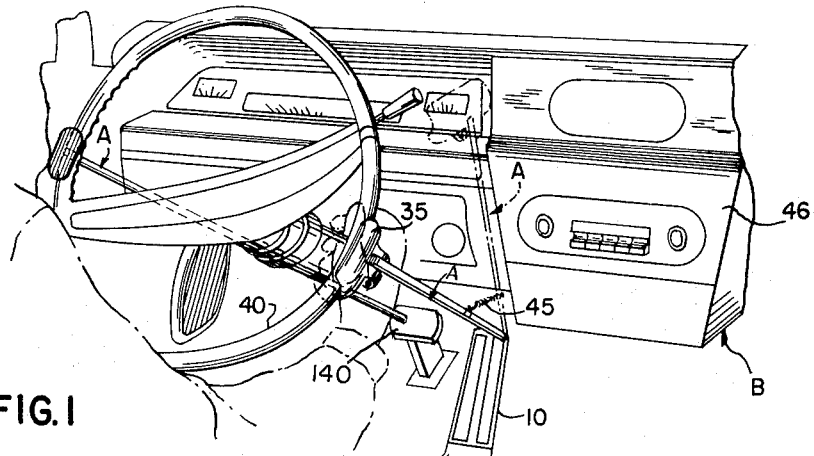
FIG. I
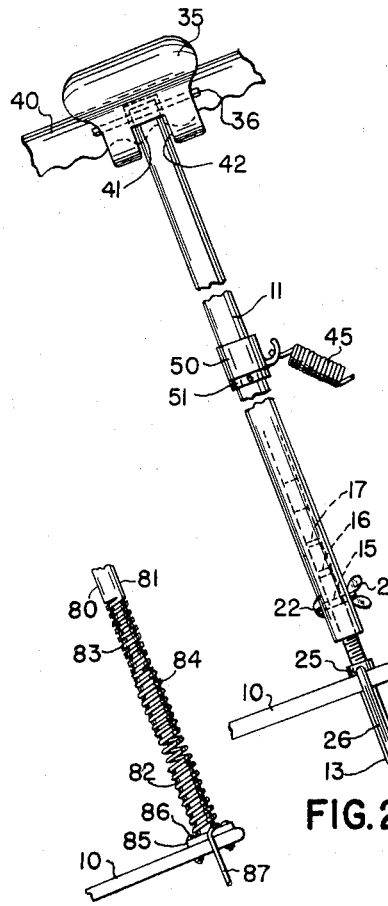
FIG. 2   FIG. 3
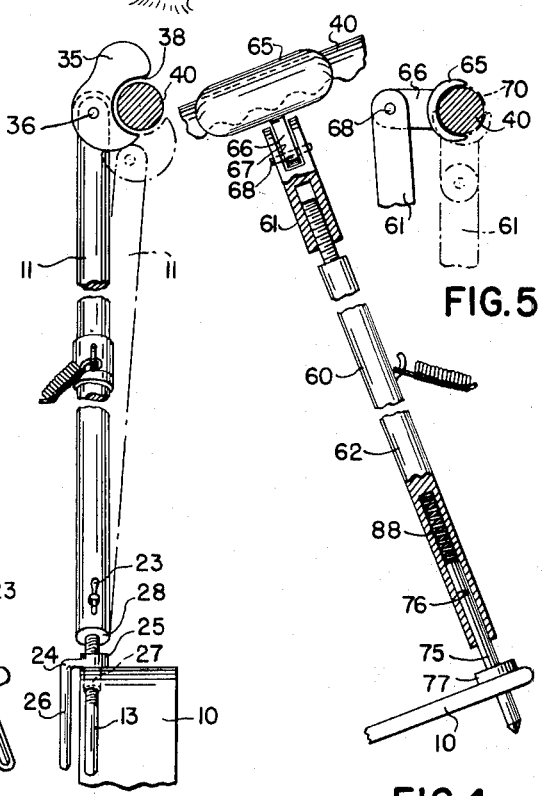
FIG. 5
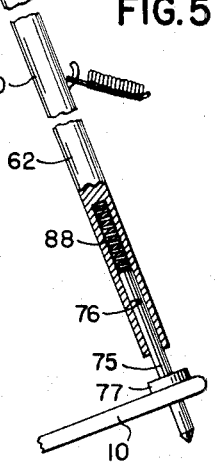
FIG. 4
FIG. 6
INVENTOR.
PAUL V. MALLOY

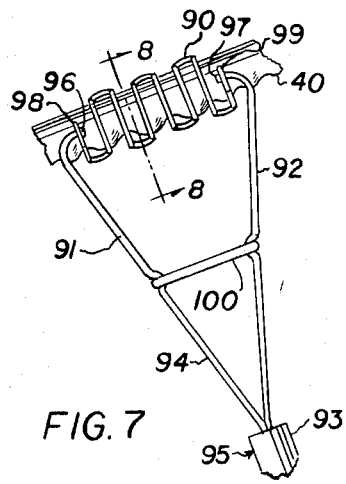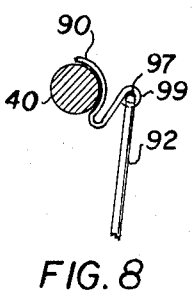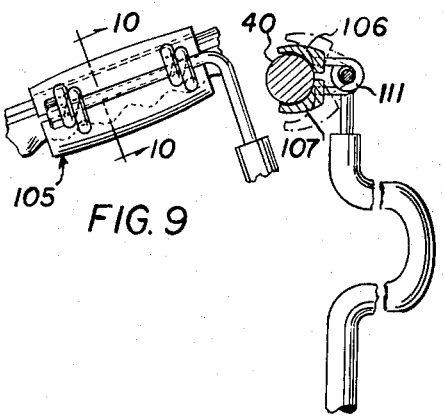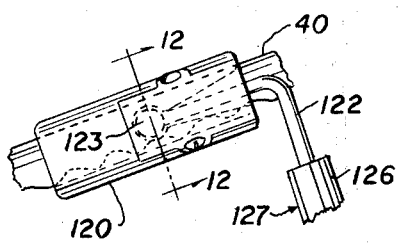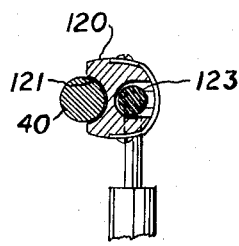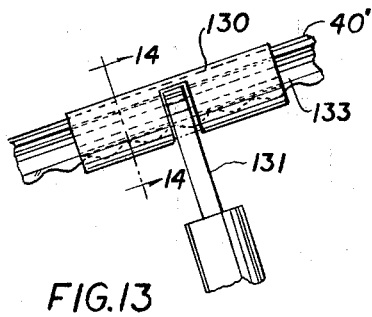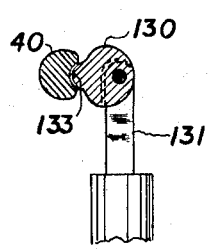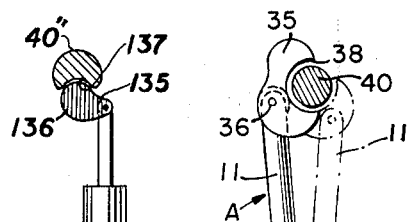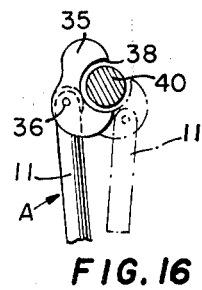
INVENTOR.
PAUL V. MALLOY

United States Patent Office 3,226,997
Patented Jan. 4, 1966

3,226,997
HAND-OPERATED EXTENSIONS FOR PEDAL TYPE
CONTROLS FOR AUTOMOTIVE VEHICLE
Paul V. Malloy, 1562 Marlowe Ave., Lakewood, Ohio
Filed May 3, 1965, Ser. No. 452,784
20 Claims. (Cl. 74—482)

The present invention relates to hand-operated extensions for pedal type controls of automotive vehicles. This application is a continuation-in-part of copending application, Serial No. 303,278 filed August 20, 1963, entitled, "Hand-Operated Fuel Feed Control for Automotive Vehicle," now abandoned, which is a continuation-in-part of my copending application, Serial No. 292,846 filed July 5, 1963, entitled, "Hand-Operated Fuel Feed Control for Automotive vehicle," now abandoned, the specification and drawings of both of which applications are incorporated herein by reference.

As all operators of automotive vehicles are aware, the constant manipulation of the accelerator pedal and/or the brake pedal is tiresome and the principal object of the present invention is the provision of a novel hand-operated device or devices which can be employed as desired for controlling the feeding of fuel to the engine and/or applying the brakes of an automotive vehicle thereby making the operation of an automotive vehicle less tiring and in turn making driving safer.

One of the principal objects of the invention is the provision of a novel hand-operated device which can be adapted for actuating a fuel feed control of an automotive vehicle or, alternatively, for actuating the brake control of an automotive vehicle, which device can be operated by a hand of the operator while holding the steering wheel and steering the vehicle with the same hand.

Other objects of the invention are the provision of a novel control device of the character referred to which can be inexpensively made; can be applied to old or new automotive vehicles with little, if any, alteration thereof; will not interfere with the normal operation of the conventional fuel feed control or brake control by the foot of the operator; and upon being released by the operator will "fall safe" and to one side of the steering wheel.

A further object of the invention is the provision of a novel control device of the character referred to which operates upon the principle of toggle linkage and which employs the rim of the steering wheel of the automotive vehicle with which it is employed as one of the hinge or pivot points of the linkage.

A more specific object of the invention is the provision of a novel and improved hand-operated device of the character referred to for controlling the movement of the conventional accelerator pedal or the movement of the conventional brake pedal of an automotive vehicle.

A still more specific object of the invention is the provision of a novel and improved hand-operated control device for controlling movement of the accelerator or brake pedal of an automotive vehicle comprising an elongated body member, e.g. rod-like member, one end of which is adapted to engage the accelerator or brake pedal and the other end of which has an operating member adapted to be held in the hand of the operator of the vehicle along with the steering wheel and which operating member is pivotally connected with the body member for movement about an axis generally transverse of the length or longitudinal axis of the body member and which is provided with a slot opening into opposite sides thereof generally parallel with but spaced from the axis about which the operating member is connected to the elongated body member and which slot is adapted to receive therein a portion of the rim of the steering wheel of the automotive vehicle.

The invention resides in certain constructions and combinations and arrangements of parts and further advantages of the invention will be apparent to those skilled in the art to which it relates from the following description of the preferred embodiments described with reference to the accompanying drawings forming a part of this specification, in which similar reference characters designate corresponding parts, and in which:

FIG. 1 is a fragmentary perspective view of the preferred embodiment of the invention installed on the accelerator pedal in an automotive vehicle and indicating the manner in which the device is held in the hand and operated by the operator of the vehicle, and in dot-dash lines the position which the device occupies when not being used;

FIG. 2 is what may be referred to as a side elevational view of the control device shown in FIG. 1;

FIG. 3 is an elevational view of the control device shown in FIG. 2 taken from what may be referred to as the front with the steering wheel in section and an alternative position of the control device shown in dot-dash lines;

FIG. 4 is a view similar to FIG. 2 but showing a modified construction and with parts in section;

FIG. 5 is a view similar to the upper part of FIG. 3 but of the modified construction shown in FIG. 4;

FIG. 6 is a view similar to the lower portion of FIG. 2 but showing a modified construction;

FIG. 7 is a view similar to the upper portion of FIG. 2 but showing a modified construction;

FIG. 8 is a view approximately on the line 8—8 of FIG. 7;

FIG. 9 is a view similar to the upper part of FIG. 2 but showing a modified construction;

FIG. 10 is a view approximately on the line 10—10 of FIG. 9;

FIG. 11 is a view similar to the upper part of FIG. 2 but showing a modified construction;

FIG. 12 is a view approximately on the line 12—12 of FIG. 11;

FIG. 13 is a view similar to the upper part of FIG. 2 but showing a modified construction;

FIG. 14 is a view approximately on the line 14—14 of FIG. 13;

FIG. 15 is a view similar to FIG. 14 but showing a still further modified construction; and FIG. 16 is a view similar to FIG. 3, but showing a slightly modified construction.

Referring particularly to FIGS. 1 to 3 of the drawings, the preferred embodiment of the invention shown therein is a hand-operated control device designated in its entirety by the reference character A for operating the accelerator pedal 10 of an automotive vehicle of commercial construction, designated generally by the reference character B, and only a portion of which is shown in the drawings. The control device A comprises an elongated body member 11, in the present instance, a round rod-like member. The body member, however, may be of any desired suitable construction. The lower end of the body member 11 is provided with an extension of reduced diameter. As shown, the extension is in the form of a rod or pin 13 adjustably supported in a centrally located aperture 14 in the lower end of the member 11. At least, the lower extending portion of the rod 13 is threaded and its upper end is provided with a plurality of holes 15, 16 and 17 spaced longitudinally of the rod 13 and adapted to be selectively aligned with two aligned holes in the member 11 for the purpose of adjusting the length of the projection of the rod 13 beyond the end of the member 11. With one of the holes 15, 16 or 17 in the rod 13 aligned with the holes in the member 11 the two parts are secured together by a headed screw 22 having a wing nut 23 on its threaded end.

The rod 13 has an inverted L-shaped integral member 24 threaded on its extending end. The short arm of the member 24 has a cylindrically-shaped part 25 threaded on the rod 13 and a long arm 26 of the member 24 extends parallel with the extending part of the rod 13, but is slightly offset therefrom. The control device is intended to be installed in an automotive vehicle as shown in FIG. 1, with the extending part of the rod 13 projecting loosely through a small hole 27 in the accelerator pedal 10 adjacent to its upper right-hand corner, as viewed from the operator's position, and the arm 26 of the member 24 projecting downwardly alongside the accelerator pedal. When the control device A is so installed in an automotive vehicle, it will be apparent that lengthwise movement of the body member 11, because of the abutting engagement of the lower side of the part 25 of the member 24 with the upper side of the accelerator pedal, will depress the accelerator pedal or allow it to raise depending upon the direction in which the member 11 is moved. As an alternative construction the member 24 can be omitted in which event the upper side of the accelerator pedal is engaged by the shoulder 28 or lower end of the member 11. The purpose of the two adjustments referred to, that is, the adjustment of the upper end of the member 13 in the aperture 14 in the member 11 by projecting the screw 22 through different holes 15, 16 and 17 of the rod or pin member 13, and the adjustment of the member 24 along the member 13 by virtue of the threaded connection between the extending part of the rod 13 and the member 24 will be hereinafter described.

The upper end of the rod-like body member 11 has an operating member or hand grasp 35 connected thereto by a pivot or pintle pin 36 for pivotal movement about an axis extending generally transversely of the length of the body member. The pivotal or hinge joint shown connecting the body member 11 and the operating member 35 is of the type sometimes referred to as a knuckle joint, but it is to be understood that any suitable pivotal connection may be employed. The operating member 35 is provided with a groove or slot-like aperture 38 extending thereacross the length of which is generally parallel with the axis of rotation of the articulated members 11 and 35 relative to one another. The groove 38 is located outwardly, i.e., spaced, from the axis of the pivot pin 36 a short distance and is of such a size that it will receive therein a portion of the rim of the steering wheel 40 of the automotive vehicle with which the control device is used.

The size and shape of the operating member 35 is such that when the steering wheel of the vehicle is engaged in the groove 38 thereof it and the rim of the steering wheel can be readily and comfortably grasped in the right hand of the operator with the upper portion of the body member 11 extending between two of the operator's fingers, as illustrated in FIG. 1 of the drawings. The combined length of the body and operating members 10 and 35 is such that with the accelerator 10 in its up or raised position and with the member 24, or the shoulder 28, as the case may be, at the lower end of the body member 11 engaging the upper side of the accelerator and with the steering wheel of the vehicle engaged in the groove 38 of the operating member, the members make an angle with one another, and as the operator rotates the operating member 35 about the rim of the steering wheel in a downwardly direction, i.e., away from him, the angle referred to becomes larger and the accelerator is depressed. The action referred to is somewhat similar to that of a toggle linkage or mechanism, the three pivot points of which are the engagement between the accelerator 10 and the lower end of the member 11, the axis of the pivot pin 36 and the axis of rotation of the operating member 35 about the rim of the steering wheel 40.

The operating member 35, as shown, has substantial thickness and is such that when the operator grasps the same and the steering wheel, as mentioned above, he can easily engage the upper left-hand part or side thereof with his thumb, including the part thereof forming part of his palm, and thereby readily rotate the operating member about the rim of the steering wheel to depress the accelerator pedal. The pivot pin 36 or more particularly the axis of rotation between the members 11 and 35 is offset from the axis about which the member 35 is rotated about the rim of the steering wheel a sufficient distance to produce the required movement of the accelerator pedal. It desired, the edge 41, of the slot 42 in the operating member 35 within which slot the upper end of the body member 11 extends, and the adjacent side of the member 11 form abutments which limit the rotation of the member 35 about the pivot 30 relative to the member 11 in a counterclockwise direction as viewed in FIG. 3 and the edge or end 41 of the slot 42 may be so located as to prevent the axis of the pivotal connection between the members 11 and 35 traveling past dead center as the member 35 is rotated about the rim of the steering wheel thus preventing the toggle, referred to, from locking.

The control device A includes a tension spring 45 connected to the body member 11 above the shoulder 28, preferably a distance equal to approximately one-third the length of the body member and to a part of the vehicle underneath the dash panel 46. The purpose of the spring 45 is to move the upper end of the control device away from the steering wheel upon the operator releasing the same and toward the dash panel 46 against which it is held by the spring until it is again put into use by the operator.

The construction of the preferred embodiment just described is such that the overall length of the device can be adjusted to accommodate automotive vehicles having different distances between the accelerator pedal and the steering wheel by moving the screw 22 from one of the holes 15, 16 or 17 of the member 13 and/or rotating the extension 13 of the member 11 relative to the member 24.

In some instances it may be desirable to make a slight adjustment of the overall length of the device while the vehicle is in motion. In this event, it is merely necessary for the operator to release the operating member 35 from the steering wheel and while steering the car with his left hand rotate the body member 11 including the extension 13 thus effecting an adjustment of the member 35 along the extension 13. While this is being done the operator can readily control the accelerator pedal by his foot. When it is desired to provide for adjustment of the length of the control device during operation of the vehicle, as mentioned, the end of the spring 45 connected to the body portion 11 of the control device is preferably connected to a collar or sleeve 50 rotatably connected to the body member but fixed against movement longitudinally thereof in a direction toward the lower end of the body as by a collar 51 adjustably connected thereto so as to permit the body member 11 to rotate within the collar member 50 to which the spring it attached. This type of adjustment may be made for various reasons including that of changing the angular position of the operating member 35 about the rim of the steering wheel to a more comfortable position, to increase or decrease or limit the amount that the accelerator pedal can be depressed by manipulation of the operating member, or to change the position of the accelerator pedal at which the toggle locks, etc.

If desired, the adjustable features may be omitted in which event the control device can be made very inexpensively or cheaply, preferably of plastic.

The length of the extension 13 on the lower end of the body member and the length of the member 26 connected to the member 24 are preferably such that in the normal operation of the control device neither will strike the floor of the vehicle nor will they become disengaged from the accelerator pedal if the pedal is depressed by the operator using his foot while holding the operating member 35 of the control device against the steering wheel.

Referring to the alternative construction shown in FIGS. 4 and 5 of the drawings, the body member, designated generally by the reference character 60, comprises two parts, 61, 62, the upper part of which, that is the part 61, is counterbored and internally threaded at its lower end for the reception of the upper threaded end of the lower part 62. This provides means for adjusting the length of the body member by rotating the upper part thereof relative to the lower part. The operating member 65, which corresponds with the operating member 35 of the preferred embodiment, is what may be described as having the shape of a capital T with the stem portion 66 projecting into a slot 67 in the upper end of the upper part 62 of the body member 60 and pivotally connected to the body member by a pivot or pintle pin 68 projecting through aligned apertures in the respective members. The cross portion of the T is provided with a groove or slot-like aperture 70, similar to the aperture 38 in the member 35. With the construction just referred to, that part of the operating member which is grasped by the hand can be made fairly thin since the pivot pin is not within the grasp of the operator. It also facilitates or makes possible the use of a larger distance than can be employed in the preferred embodiment between the axis of the pivotal connection between the body and operating members thereof and the axis about which the operating member is rotated around the rim of the steering wheel.

In the embodiment shown in FIG. 4 the extension at the lower end of the body member of the control device is in the form of a pin or rod-like member 75, the upper end of which is slidably supported in a centrally located aperture 76 in the lower end of the bottom part 62 of the body member. The pin 75 is provided with a flange 77 spaced upwardly from its lower end and which lower end is adapted to be located in the aperture in the accelerator pedal. The member or pin 75 is biased in a direction toward the accelerator pedal by a light spring 88 interposed between the upper end thereof and the bottom of the recess or aperture 76 within which it is slidably supported. The spring referred to is relatively light and is not strong enough to overcome the resistance of the accelerator pedal to movement in a downwardly direction. The construction just referred to forms a lost motion connection which allows the accelerator pedal to be depressed by the foot of the operator with the upper end of the control device held in engagement with the steering wheel without the lower end of the extension becoming disengaged from the accelerator pedal.

In an alternative construction shown in FIG. 6, the body member 80, corresponding with the member 11 of the embodiment shown in FIGS. 1 to 3, is made in two parts, 81, 82. The lower portion of the upper part 81 is provided with a spiral groove 83 within which the upper end of a relatively stiff open coil spiral spring 84 is threaded. The lower end of the spring 84 has a relatively close sliding fit with the lower member 82 of the body portion. The lower end of the member 82 is provided with a flange 85 and is fixedly secured to the accelerator pedal 10 of the automotive vehicle by bolts 86 extending through suitable aligned apertures in the flange 85 and the pedal 10. The lower end 87 of the spring 84 is extended downwardly along one side of the pedal 10 so as to limit relative rotation between the member 82 and the spring 84 upon rotating the upper portion 81 of the body member 80 relative to the lower portion 82 and in turn the upper portion of the spring 84 when it is desired to adjust the overall length of the control device.

The weight of the spring 84 is such that it is much stronger than the forces resisting downward movement of the accelerator pedal 10 of the automotive vehicle so that there will be very little, if any, compression of the spring 84 when the control device is used to depress the accelerator pedal 10. If the inclination of the accelerator pedal 10, when in its raised position, is such that when the operating member of the control device is released it will not move to a position free of the steering wheel, the lower surface of the flange 85 of the member 82 can be inclined or bent so that the member 82 will project from the accelerator pedal in such a manner that the operating member of the control device will move free of the steering wheel when released. This movement will be effected by the resiliency of the spring 84 and, as will be understood, no spring similar to the spring 45 of the preferred embodiment will be required.

In the embodiment of the invention shown in FIGS. 7 and 8, the operating member 90 is generally similar to the operating members previously referred to except that it is made of suitable bent wire and is pivotally connected to a pair of tines 91, 92 connected to a rod-like member 93. The tines 91, 92 and the rod-like member 93 form the upper part 94 of the body member of the control device, which body member is designated generally by the reference character 95. The member 90 is pivotally connected to the upper ends of the tines 91, 92 by the engagement of inwardly turned ends 96, 97 of the tines 91, 92 within suitable eyes 98, 99 formed by suitably bending the ends of the wire from which the member 90 is formed. It will be noted that the eyes are offset to the right, as viewed in FIG. 8, from the main body portion of the operating member 90 thus spacing the groove or depression in the operating member 90 within which the steering wheel 40 is engaged from the pivotal axis between the operating member 90 and the upper end of the body member 95 of the control device. The operating member 90 may be connected or disconnected from the tines 91, 92 by moving a link 100 which surrounds the tines approximately midway between their ends toward the member 93, thus allowing the free ends of the tines to be readily moved apart to release the operating member 90. The link 100 normally engages in grooves formed in the tines by inwardly bent portions thereof as clearly shown in FIG. 7. It is to be understood that the lower part of the control device may be similar to the corresponding parts of the previously described control devices.

In the embodiment shown in FIGS. 9 and 10, the operating member 105 of the control device comprises two parts 106, 107, adapted to be grasped in the hand of the operator, connected together by springs 110, 111. The springs 110, 111 each make a loop which forms eyes offset from the members 106, 107 by means of which the operating member is pivotally connected to the part 112 of the body member of the control device, which body member is designated generally by the reference character 113.

In the embodiment shown, the part 112 is a cylindrical rod having upper and lower portions extending at approximately right angles to one another. The upper portion of the part 112 extends through the eye in the spring members 110, 111 thus providing a pivotal connection between the operating member 105 and the body member 113 of the control member. The lower portion of the member 112 is suitably secured in the upper end of a rod-like member 115 forming a part of the body member of the control device. Suitable abutments, such as the enlargement 116 on the upper portion of the part 112 and the nut 117 threaded onto the free end of the part 112 secured the operating member 105 to the member 112 while permitting pivotal motion therebetween. As will be understood the operating member 105 may be secured to the body member of the device by tines in a manner similar to that in which the operating member 90 is secured to the body member of the control device of the embodiment shown in FIGS. 7 and 8.

The two members 106, 107 of the operating member 105 normally occupy the positions shown in dot-dash lines in FIG. 10, but are adapted to engage about the steering wheel 40 of the automotive vehicle, as shown in full lines, contacting the same generally at the upper and lower surfaces thereof and toward the eyes formed by the springs 110, 111, and when so held in contact with the steering wheel by the operator of the vehicle the steering wheel can be or is gripped by the operator through the members 106 and 107. Alternatively the members 106 and 107 can be so formed that the operator can grip the same and the steering wheel at the same time directly in his hand. It is to be understood that the lower part of the control device may be similar to the corresponding parts of the previously described control devices. It is to be understood that the lower part of the control device may be similar to the corresponding parts of the previously described control devices.

In most automotive vehicles in which the control device of the present invention is or will be installed, the plane of the steering wheel is or will not be normal to the length of the body member of the control device, but it will be approximately so. Any difference from normal, however, is not only not detrimental to the use of the present invention, but is advantageous because a certain degree of additional control can be obtained by the operator moving the operating member of the control device along the steering wheel, that is, circumferentially of the steering wheel. As can be appreciated, this will vary the effective length of the control device.

Limited rotation of the steering wheel incident to steering the automotive vehicle does not materially affect the operation of the control device. When sharp turns are made, steering can be effected by the left hand and the rim of the steering wheel merely slid, so-to-speak, through the right hand and the groove in the operating member which are held stationary.

In order to facilitate a more uniform contact between the operating member of the control device and the steering wheel of the automotive vehicle with which it is used, the operating member can be pivoted to the upper end of the body member of the control device for limited universal movement, for example, as illustrated in the embodiment shown in FIGS. 11 and 12. As shown in these figures, the operating member 120 is generally U-shaped in cross section thus providing the groove or depression 121 within which the steering wheel is adapted to be received, and is pivotally connected to the upper part of a rod-like member 122 having upper and lower parts bent at right angles to one another. The free end of the upper part of the member 122 is provided with a ball-like head 123 which is pivotally connected in a suitable socket formed in the operating member 120 and secured therein by a cover plate 124 fixed to the main portion of the operating member. The portion of the member 122 upon which the ball-like head 123 is formed projects outwardly of the operating member through an enlarged aperture 125 which allows limited universal movement of the operating member 120 about the head 123 of the member 122. The other part of the member 122 is secured to a rod-like member 126 and together therewith forms the upper part of the body member 127 of the control device. It is to be understood that the lower part of the control device may be similar to the corresponding parts of the previously described control devices.

All of the control devices shown in the figures heretofore described include an operating member having a concave surface adapted to engage the steering wheel of the automotive vehicle with which they are used. Alternative arrangements are shown in FIGS. 13, 14 and 15.

The embodiment shown in FIGS. 13 and 14 is generally similar to the embodiment shown in FIGS. 1 to 3 inclusive, except that the operating member 130, which is pivotally connected to the upper end of the body member 131, which body member may be similar to that shown in FIGS. 1 to 3, or in fact any of the other alternative constructions referred to, is provided with a projecting portion 132 rather than a groove or depression, which projecting portion is adapted to engage in a groove or depression 133 in the outer edge or rim of the steering wheel 40'.

The embodiment shown in FIG. 15 is similar to that shown in FIGS. 13 and 14, except that the operating member 135 is provided with a projection 136 adapted to engage in a groove or depression 137 in the lower side of the rim of the steering wheel 40''.

In all the embodiments illustrated, the upper ends of the body members of the control devices, with the exception of the embodiment shown in FIGS. 9 and 10 are straight, but it may be desirable in some instances to have portions of the body members offset as illustrated in FIG. 10 so as to provide clearance for the gear shift lever.

The body and operating members of the control device may be made of any suitable material such as metal, plastic, and the like. It is also to be understood that some means other than the spring 45, shown, may be employed for retaining the device in an inoperative position, for example, the upper end of the device may be manually moved from its operating position to an inoperative position adjacent to the dash panel and there retained by some suitable means provided for that purpose such as a hook.

While the invention has been described as applied to the control of an accelerator pedal of an automotive vehicle, it will be understood that it may be employed to control the brake pedal of an automotive vehicle, in which case it is placed upon the driver's left side of the steering wheel and controlled with the driver's left hand. In this event, however, referring to the illustrated control device A, the axis of the pivotal connection between member 11 and 35 preferably is so located with respect to the end or abutment 41 of the slot 42 in the member 35 that the members 11 and 35 travel a short distance past dead center as the member 35 is rotated about the rim of the steering wheel allowing the toggle to lock as illustrated in FIG. 16 in which the brake pedal is designated by the reference character 140 and thus maintain the brake in an engaged position without further attention by the operator.

It is evident from the foregoing description that one of the novel devices may be used to control either the accelerator pedal or the brake pedal of an automobile or that two of the novel hand-operated devices may be used as a set to control both the fuel flow and the braking of an automotive vehicle, the right hand controlling the accelerator and the left hand controlling the brake and both hands cooperating in controlling the steering of the automobile.

It has been found that the novel hand-operated device when used in cooperation with the brake is particularly useful when the car has come to a complete stop such as at a stoplight, at which time the hand-operated control may be engaged and the foot removed from the brake pedal. It is well known that with a car having a standard transmission it is rather difficult to start the car once it has come to a rest on an incline or hill, for this requires the use of the brake, clutch and accelerator, all normally operated with the feet. The advantages of the novel device are readily apparent for it frees the left foot to engage the clutch while the right foot engages the accelerator, thus making the motion smoother, easier and safer.

From the foregoing description of the invention, it will be apparent that the objects heretofore enumerated and others have been accomplished and that there has been provided a novel and improved hand-operated control device for controlling the feeding of fuel to an engine or the engaging of the brake of an automotive vehicle which operates on the principle of a toggle and which employs the rim of the steering wheel of the vehicle as one of the hinge or pivot points.

While the present preferred embodiments of the invention are shown in the drawings and herein described in detail, the invention is susceptible of various modifications and alternate constructions and it is to be understood that there is no intention to thereby limit the invention to the specific form disclosed, it being the intention to cover all modifications and alternative constructions falling within the spirit and scope of the invention as expressed in the appended claims.

Having thus described my invention, what I claim is:

1. In a hand-operated control device for actuating a pedal-type control of an automotive vehicle having a steering wheel, an elongated first member having one end adapted to connect with a control pedal of an automotive vehicle, and a second member at the other end of said elongated first member adapted to be grasped along with the steering wheel and connected to said first member for pivotal movement about an axis extending transversely of the longitudinal axis or length of said first member, said second member having a surface offset from the axis of the pivotal connection between said first member and said second member and which surface is adapted to engage with the steering wheel of the automotive vehicle.

2. In a hand-operated control device for actuating a pedal-type control of an automotive vehicle having a steering wheel, an elongated first member having one end adapted to connect with a control pedal of an automotive vehicle, and a second member at the other end of said elongated first member adapted to be grasped along with the steering wheel and connected to said first member for pivotal movement about an axis extending transversely of the longitudinal axis or length of said first member, said second member having a groove or slot-like aperture therein generally parallel to and offset from the axis of the pivotal connection between said first member and said second member and which groove or slot-like aperture is adapted to engage with the steering wheel of the automotive vehicle.

3. In a hand-operated control device for actuating a pedal-type fuel feed control of an automotive vehicle, an elongated first member having one end adapted to connect with a fuel feed control pedal of an automotive vehicle, a second member at the other end of said elongated first member adapted to be grasped along with the steering wheel, and means connecting said second member to said first member for pivotal movement about an axis extending transversely of the longitudinal axis or length of said first member, said second member having a groove or slot-like aperture therein generally parallel to and offset from the axis of the pivotal connection between said first member and said second member and which groove or slot-like aperture is adapted to engage with the steering wheel of the automotive vehicle.

4. In a hand-operated control device for actuating a pedal-type control of an automotive vehicle having a steering wheel, an elongated first member having one end adapted to connect with a control pedal of an automotive vehicle, a second member at the other end of said elongated first member adapted to be grasped along with the steering wheel and connected to said first member for pivotal movement about an axis extending transversely of the longitudinal axis or length of said first member, said second member having a surface offset from the axis of the pivotal connection between said first member and said second member and which surface is adapted to engage with the steering wheel of the automotive vehicle, and resilient means biasing the members away from the steering wheel of the vehicle.

5. In a hand-operated control device for actuating a pedal-type control of an automotive vehicle, an elongated first member having one end adapted to connect with a control pedal of an automotive vehicle, a second member at the other end of said elongated first member adapted to be grasped along with the steering wheel and connected to said first member for pivotal movement about an axis extending transversely of the longitudinal axis or length of said first member, said second member having a groove or slot-like aperture therein generally parallel to and offset from the axis of the pivotal connection between said first member and said second member and which groove or slot-like aperture is adapted to engage with the steering wheel of the automotive vehicle, and resilient means connected to said first member and adapted to be connected to a part of the vehicle for biasing the members toward the dash panel of the vehicle.

6. In a hand-operated control device for actuating a pedal-type control of an automotive vehicle having a steering wheel, an elongated first member having one end adapted to connect with a control pedal of an automotive vehicle, a second member at the other end of said elongated first member adapted to be grasped along with the steering wheel, means connecting said second member to said first member for pivotal movement about an axis extending transversely of the longitudinal axis or length of said first member, said second member having a surface offset from the axis of the pivotal connection between said first member and said second member and which surface is adapted to engage with the steering wheel of the automotive vehicle, and means for adjusting the length of said elongated first member.

7. In a hand-operated control device for actuating a pedal-type fuel feed control of an automotive vehicle, an elongated first member having one end adapted to abuttably engage a fuel feed control pedal of an automotive vehicle, a second member at the other end of said elongated first member adapted to be grasped along with the steering wheel, means connecting said second member to said first member for pivotal movement about an axis extending transversely of the longitudinal axis or length of said first member, said second member having a groove or slot-like aperture therein generally parallel to and offset from the axis of the pivotal connection between said first member and said second member and which groove or slot-like aperture is adapted to engage with the steering wheel of the automotive vehicle, and means for adjusting the length of said elongated first member.

8. In a hand-operated control device for actuating a pedal-type control of an automotive vehicle, a two-part elongated first member having one end adapted to connect with a control pedal of an automotive vehicle, a second member at the other end of said elongated first member adapted to be grasped along with the steering wheel, means connecting said second member to said first member for pivotal movement about an axis extending transversely of the longitudinal axis or length of said first member, said second member having a groove or slot-like aperture therein generally parallel to and offset from the axis of the pivotal connection between said first and second members and which groove or slot-like aperture is adapted to engage with the steering wheel of the automotive vehicle, and threaded means coupling said two parts of said elongated first member for adjusting the length thereof upon relative rotation between the two parts.

9. In a hand-operated control device for actuating a pedal-type control of an automotive vehicle, a two-part elongated first member having one end adapted to connect with a control pedal of an automotive vehicle, a second member at the other end of said elongated first member adapted to be grasped along with the steering wheel, means connecting said second member to said first member for pivotal movement about an axis extending transversely of the longitudinal axis or length of said first member, said second member having a groove or slot-like aperture therein generally parallel to and offset from the axis of the pivotal connection between said first and second members and which groove or slot-like aperture is adapted to engage with the steering wheel of the automotive vehicle, threaded means coupling said two parts of said elongated first member for adjusting the length thereof upon relative rotation between the two parts, and said threaded means including an open coil spring having thread-like engagement in a spiral groove in one of said parts of said elongated first member.

10. In a hand-operated control device for actuating a pedal-type control of an automotive vehicle having a steering wheel, an elongated first member having one end adapted to connect with a control pedal of an automotive vehicle, and a second member made of wire at the other end of said elongated first member adapted to be grasped along with the steering wheel and connected to said first member for pivotal movement about an axis extending transversely of the longitudinal axis or length of said first member, said second member having a groove or slot-like aperture therein generally parallel to and offset from the axis of the pivotal connection between said first member and said second member and which groove or slot-like aperture is adapted to engage with the steering wheel of the automotive vehicle.

11. In an automotive vehicle, a pedal-type control, a steering wheel, an elongated first member having one end adapted to connect with said control pedal, and a second member at the opposite end of said elongated first member adapted to be grasped along with the steering wheel and connected thereto for pivotal movement about an axis extending generally transversely of the longitudinal axis or length of said first member, said steering wheel and said second member having cooperating interfiller portions extending generally parallel to and offset from the axis of the pivotal connection between said first member and said second member.

12. In an automotive vehicle, a pedal-type control, a steering wheel, an enlongated first member having one end adapted to connect with the control pedal, and a second member at the opposite end of said elongated first member connected thereto for pivotal movement about an axis extending generally transversely of the longitudinal axis or length of said first member, and said steering wheel and said second member having a cooperating slot-like aperture and projection extending generally parallel to and offset from the axis of the pivotal connection between said first member and said second member and which groove or slot-like aperture is adapted to engage with the steering wheel of the automotive vehicle.

13. In an automotive vehicle having a pedal-type control and a steering wheel, a hand-operated control device for actuating the control pedal comprising an elongated first member having one end adapted to connect with the control pedal, a second member at the opposite end of said elongated first member adapted to be grasped along with the steering wheel and connected thereto for pivotal movement about an axis extending generally transversely of the longitudinal axis or length of said first member, said second member having a groove or a slot-like aperture therein extending generally parallel to and offset from the axis of the pivotal connection between said first member and said second member and which groove or slot-like aperture is adapted to engage with the steering wheel of the automotive vehicle, and means for biasing said members away from the steering wheel of the vehicle.

14. In an automotive vehicle, a pedal-type control, a steering wheel, an elongated first member having one end adapted to engage the control pedal, and a second member at the opposite end of said elongated first member connected thereto for pivotal movement about an axis extending generally transversely of the longitudinal axis or length of said first member, said steering wheel having a slot-like aperture therein and said second member having a projection extending generally parallel to and offset from the axis of the pivotal connection between said first member and said second member and engageable within said slot in said steering wheel.

15. In an automotive vehicle having a dash panel, a pedal-type control provided with an opening therethrough and a steering wheel, a hand-operated control device for actuating the control pedal comprising an elongated first member having one end adapted to abut the operator's side of the control pedal and having an extending portion of reduced cross-sectional area adapted to extend through the opening in the control pedal, a second member at the opposite end of said elongated first member connected thereto for pivotal movement about an axis extending generally transversely of the longitudinal axis or length of said first member, said second member having a slot-like aperture therein extending generally parallel to and offset from the axis of the pivotal conenction between said first member and said second member, said second member being adapted to be held against the steering wheel of the vehicle with the rim or circumference of the steering wheel in said slot in said second member and pivoted about the rim of the steering wheel to actuate or control actuation of the control pedal.

16. In an automotive vehicle having a dash panel, a steering wheel and a fuel feed control including a movable member located within the operator's compartment to the right of the steering wheel and below the dash panel, a hand-operated control device for controlling movement of said movable fuel feed control member comprising an elongated first member having one end adapted to engage the movable fuel feed control member located below the dash panel, a second member at the opposite end of said elongated first member connected thereto for pivotal movement about an axis extending generally transversely of the longitudinal axis or the length of said first member, said second member having a slot-like aperture therein extending generally parallel to and offset from the axis of the pivotal connection between said first member and said second member, said second member being adapted to be held against the steering wheel of the vehicle with the rim of the steering wheel in said slot whereby said first and second members constitute a toggle linkage of which the steering wheel forms one of the hinge points.

17. In an automotive vehicle having a dash panel, a pedal-type accelerator provided with an opening therethrough and a steering wheel, a hand-operated control device for actuating the accelerator pedal comprising an elongated first member having one end adapted to abut the operator's side of the accelerator pedal and having an extending portion of reduced cross-sectional area adapted to extend through the opening in the accelerator pedal, a second member at the opposite end of said elongated first member connected thereto for pivotal movement about an axis extending generally transversely of the longitudinal axis or length of said first member, said second member having a slot-like aperture therein opening into opposite sides and extending generally parallel to and offset from the axis of the pivotal connection between said first member and said second member, means connected to said first member and adapted to be connected to a part of the vehicle underneath or behind the dash panel for biasing said first member toward the dash panel, and said second member being adapted to be held against the steering wheel of the automobile with the rim or circumference of the steering wheel in said slot in said second member and pivoted about the rim of the steering wheel to actuate or control actuation of the accelerator pedal.

18. In an automotive vehicle having a dash panel, a steering wheel and a fuel feed control including a pedal member located within the operator's compartment to the right of the steering wheel and below the dash panel, a hand-operated control device for controlling movement of said fuel feed control pedal member comprising an elongated first member having one end adapted to connect with the fuel feed control pedal member located below the dash panel, a second member at the opposite end of said elongated first member connected thereto for pivotal movement about an axis extending generally transversely of the longitudinal axis or the length of said first member, said second member having a slot-like aperture therein extending generally parallel to and offset from the axis of the pivotal connection between said first member and said second member, said second member being adapted to be held against the steering wheel of the vehicle with the rim of the steering wheel in said slot whereby said first and second members constitute a toggle linkage of which the steering wheel forms one of the hinge points, and said first and second members having abutment means limiting pivotal movement therebetween to a small amount short of dead center.

19. In an automotive vehicle having a dash panel, a steering wheel and a brake control including a pedal member located within the operator's compartment to the left of the steering wheel and below the dash panel, a hand-operated control device for controlling movement of said brake control pedal member comprising an elongated first member having one end adapted to connect with the brake control pedal member located below the dash panel, a second member at the opposite end of said elongated first member connected thereto for pivotal movement about an axis extending generally transversely of the longitudinal axis or the length of said first member, said second member having a slot-like aperture therein extending generally parallel to and offset from the axis of the pivotal connection between said first member and said second member, said second member being adapted to be held against the steering wheel of the vehicle with the rim of the steering wheel in said slot whereby said first and second members constitute a toggle linkage of which the steering wheel forms one of the hinge points, and said first and second members having abutment means limiting pivotal movement therebetween to a small amount beyond dead center.

20. In an automotive vehicle having a pedal-type control and a steering wheel, a hand-operated control device for actuating the control pedal comprising an elongated member having one end adapted to be connected to the control pedal, a second member at the opposite end of said elongated member connected thereto for pivotal movement about an axis extending generally transversely of the longitudinal axis or length of said first member, said second member having a groove or slot-like aperture therein extending generally parallel to and offset from the axis of the pivotal connection between said first member and said second member, said second member being adapted to be held against the rim of the steering wheel of the vehicle with the rim of the steering wheel in said groove or slot-like aperture whereby said first and second members constitute a toggle linkage of which the steering wheel forms one of the hinge points, and means for biasing said members away from the steering wheel of the vehicle.

References Cited by the Examiner
UNITED STATES PATENTS

| | | | |
|---|---|---|---|
| 786,772 | 4/1905 | Lonn | 74—486 |
| 1,548,725 | 8/1925 | Lanwaring | 74—481 |
| 1,585,855 | 5/1926 | Hawn | 74—481 |
| 1,683,111 | 9/1928 | Washington | 74—481 |
| 1,815,871 | 7/1931 | Douglas | 74—486 |
| 2,438,380 | 3/1948 | Arens | 74—501 |
| 2,755,684 | 7/1956 | Russell | 74—482 |
| 2,784,615 | 3/1957 | Kaplan | 74—482 |
| 2,866,356 | 12/1958 | Elam | 74—481 |
| 2,960,885 | 11/1960 | Donaldson | 74—482 |
| 3,105,391 | 10/1963 | Thompson | 74—532 |
| 3,127,141 | 3/1964 | Elliston | 248—117.6 |
| 3,153,350 | 10/1964 | Dishart | 74—482 |
| 3,169,731 | 2/1965 | Phillips et al. | 74—495 X |

FOREIGN PATENTS 356,325   9/1931   Great Britain.

BROUGHTON G. DURHAM, *Primary Examiner.*

CAROLYN F. GREEN, *Assistant Examiner.*